United States Patent
Hong (10) Patent No.: US 9,324,170 B2
(45) Date of Patent: Apr. 26, 2016

(54) CREATING A BLENDED IMAGE

(75) Inventor: Wei Hong, Sunnyvale, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 69 days.

(21) Appl. No.: 14/239,511

(22) PCT Filed: Aug. 18, 2011

(86) PCT No.: PCT/US2011/048194
§ 371 (c)(1),
(2), (4) Date: Feb. 18, 2014

(87) PCT Pub. No.: WO2013/025219
PCT Pub. Date: Feb. 21, 2013

(65) Prior Publication Data
US 2014/0169666 A1    Jun. 19, 2014

(51) Int. Cl.
*G06K 9/48* (2006.01)
*G06T 11/60* (2006.01)
*G06T 15/50* (2011.01)
*G06T 11/00* (2006.01)

(52) U.S. Cl.
CPC ............... *G06T 11/60* (2013.01); *G06T 11/00* (2013.01); *G06T 11/001* (2013.01); *G06T 15/503* (2013.01)

(58) Field of Classification Search
CPC ....... G06T 11/001; G06T 11/60; G06T 5/001; G06T 7/0083; G06T 7/0085; G06T 2207/10016
See application file for complete search history.

(56) References Cited

U.S. PATENT DOCUMENTS

| 6,023,302 | A | 2/2000 | MacInnis et al. |
| 6,429,878 | B1 | 8/2002 | Turek et al. |
| 6,795,576 | B2 * | 9/2004 | Uchida ............... H04N 1/6022 358/501 |
| 7,532,770 | B2 | 5/2009 | Pfister |
| 7,907,791 | B2 * | 3/2011 | Kinrot .................. G06T 1/0007 382/276 |
| 8,107,726 | B2 * | 1/2012 | Xu ........................ G06K 9/6256 345/619 |
| 8,594,451 | B2 * | 11/2013 | Adams, Jr. ............ G06T 3/4015 382/266 |
| 8,620,081 | B2 * | 12/2013 | Dai .................... G06K 9/00456 382/162 |
| 8,837,853 | B2 * | 9/2014 | Tachi ..................... H04N 5/217 382/263 |
| 8,867,831 | B2 * | 10/2014 | Mel ......................... G06T 5/003 382/162 |
| 2004/0233333 | A1 | 11/2004 | Chiu et al. |
| 2007/0248284 | A1 | 10/2007 | Bernsen et al. |
| 2009/0268973 | A1 | 10/2009 | Majewicz |
| 2014/0169666 | A1 * | 6/2014 | Hong .................... G06T 15/503 382/162 |

FOREIGN PATENT DOCUMENTS

WO    2010078954 A1    7/2010

OTHER PUBLICATIONS

Preliminary Report on Patentability, Feb. 27, 2014, PCT Patent Application No. PCT/US2011/048194.
M. Luboschik et al., "A new weaving technique for handling overlapping regions," Procs. of AVI '10, May 25-29, 2010 (Rome, Italy).
Written opinion and international search report in counterpart PCT patent application, PCT/US2011/048194, dated Mar. 9, 2012.

* cited by examiner

*Primary Examiner* — Amir Alavi
(74) *Attorney, Agent, or Firm* — Michael A. Dryja (57) ABSTRACT

A blended image is created as follows. An overlay image frame is received in a device implemented by electronic circuitry. The overlay image frame has multiple pixels. A blending factor is determined with the device for each pixel in the overlay image frame. The blending factor is based on the color saturation surrounding the pixel such that an amount by which the pixel contributes to a blended image of the overlay image frame with an underlying image frame is based on the blending factor.

12 Claims, 7 Drawing Sheets

CREATING A BLENDED IMAGE

This application is a 371 of PCT/US2011/048194 Aug. 18, 2011

BACKGROUND

As individuals and organizations increase their consumption of digital visual media, the demand for increasingly complex image processing products continues to grow. One field in which image processing has been particularly active is that of image blending. In image blending, two separately rendered digital images are combined into and displayed as single digital image. This functionality may be useful, for example, in a video conferencing application that combines a first video image of participants from a remote site with a second video image of presentation materials to create a single video image depicting the participants at the remote site in the background and the shared presentation materials in the foreground.

When combining a background image with a foreground image to create a blended image, it may be desirable to make certain portions of the foreground image appear relatively more transparent or opaque with respect to other portions of the foreground image. For example, it may be desirable to make the most important features of the foreground image more opaque to convey a clear picture of the foreground, while making less-important areas of the foreground image more transparent to show the background image.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

As described above, when combining a background image with a foreground image to create a blended image, it may be desirable to make certain portions of the foreground image appear relatively more transparent or opaque with respect to other portions of the foreground image. For example, it may be aesthetically preferable to make the most important features of the foreground image more opaque to convey a clear picture of the foreground, while making less-important areas of the foreground image more transparent to show the background image.

In light of these and other considerations, the present specification discloses methods and systems of combining two or more images to create a blended image. For example, the present specification discloses methods which include at least: a) receiving an overlay image frame in a device implemented by electronic circuitry, the overlay image frame having multiple pixels; and b) determining a blending factor with the device for each pixel in the overlay image frame based on the color saturation surrounding that pixel, in which an amount by which the pixel contributes to a blended image of the overlay image frame with an underlying image frame is based on the blending factor.

The specification further discloses examples of methods for creating a blended image which include at least: a) receiving an overlay image frame and an underlying image frame in a device implemented by electronic circuitry, each of the image frames having multiple pixels; b) for each pixel in the overlay image frame, determining with the device a blending factor based on edge information associated with an area surrounding the pixel and saturation information associated with the area surrounding the pixel; and c) combining the overlay image frame and the underlying image frame into a blended image frame with the device such that an opacity of each pixel of the overlay image frame in the blended image is determined by the blending factor for that pixel.

The specification also discloses examples of image processing systems that include at least electronic circuitry communicatively coupled to a first image source and a second image source such that the electronic circuitry blends an image frame received from the first image source with an image frame received from the second image source by: a) for each pixel in the image frame received from the first image source, determining a blending factor based on edge information for an area surrounding the pixel and color saturation information for the area surrounding the pixel; b) creating a version of the image frame received from the first image source by altering each pixel in the image frame received from the first image source based on the blending factor for that pixel; and c) combining the version of the image frame received from the first image source with the image frame received from the second image source.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. The various instances of the phrase "in one example," "in certain examples" or similar phrases in various places in the specification are not necessarily all referring to the same example.

As used in the present specification, including the appended claims, the term "image frame" refers to a two-dimensional image or a digital representation of a two-dimensional image.

As used in the present specification, including the appended claims, the term "overlay image frame" refers to an image frame that, when combined with another image frame in a blended image frame, appears to be above the other image frame.

As used in the present specification, including the appended claims, the term "underlying image frame" refers to an image frame that, when combined with another image frame in a blended image frame, appears to be below the other image frame.

As used in the present specification, including the appended claims, the term "contribute" in the context of a first source pixel's contribution to a blended image refers to the extent to which the appearance or characteristic of a corresponding pixel in the blended image is attributable to the appearance or characteristic of the first source pixel, as opposed to any other source pixel.

A more detailed description will now be given of the methods and systems for creating blended images of the present specification with respect to the Figures.

Figure 1:
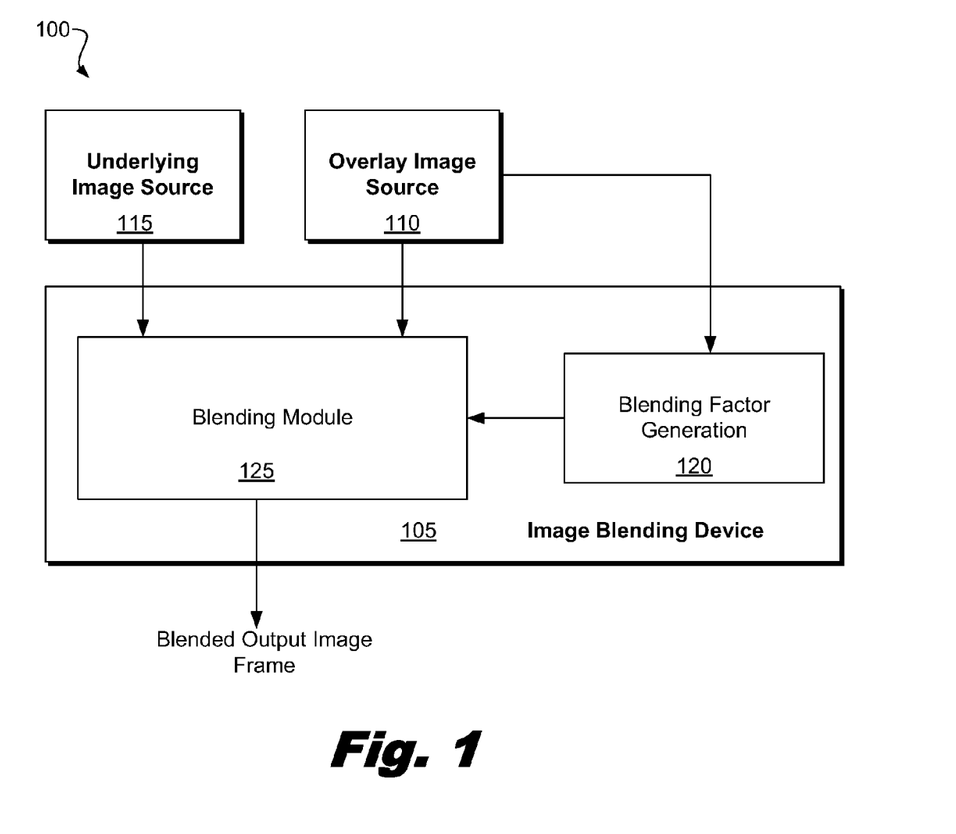
FIG. 1 is a block diagram of an illustrative image blending system according to one example of the principles described herein.

FIG. 1 is a block diagram of an illustrative system (100) for creating a blended image, according to one example of the principles of the present specification. The system (100) includes an image blending device (105) communicatively coupled to an overlay image source (110) and an underlying image source (115). The image blending device (105) combines an overlay image frame received from the overlay image source (110) with an underlying image frame received from the underlying image source (115) to create a blended output image frame.

In certain examples, the overlay image frame and the underlying image source frame may be individual frames from a sequence of frames that make up an overlay video and an underlying video, respectively, in a blended video stream. Alternatively, the overlay image frame and the underlying image source frame may be single, still image frames independent of any video.

The blended output image produced by the image blending device (105) may be a combination of the overlay image frame with the underlying image frame such that in the displayed blended output image, features of the overlay image frame appear to be above features in the underlying image frame. By adjusting the way in which the overlay image frame and the underlying image frame are combined, the opacity of certain pixels from the overlay image frame may be adjusted in the blended output image frame. In other words, for areas of overlap between the overlay image frame and the underlying image frame, the degree to which features of the underlying image frame are manifest in the blended output image frame may be determined at the blending stage of the image blending device (105).

For example, a pixel from the overlay image frame ("the overlay pixel") may be combined with a corresponding pixel from the underlying image frame ("the underlying pixel") to produce a pixel in the blended output image frame ("the blended pixel"). The contribution of the overlay pixel to the blended pixel may be adjusted in proportion to a determined importance of the overlay pixel to the overlay image frame. Thus, if the overlay pixel is near a high color saturation area and/or is near an image feature edge in the overlay image frame, the contribution of the overlay pixel to the blended pixel may be increased relative to the underlying pixel such that the portion of the overlay image frame corresponding to the overlay pixel appears more opaque in the blended image frame. Conversely, if the overlay pixel is not near a high color saturation area and/or is not near an image feature edge in the overlay image, the contribution of the overlay pixel to the blended pixel may be decreased relative to the underlying pixel such that the portion of the overlay image frame corresponding to the overlay pixel appears more transparent in the blended image frame.

The image blending device (105) may include electronic circuitry, such as a processor, an application-specific integrated circuit, a field programmable gate array, or the like, that implements a blending factor generation module (120) and a blending module (125). The blending factor generation module (120) determines the relative importance of each pixel in the overlay image frame and generates a blending factor for that pixel. The blending factor for each pixel in the overlay image frame is used by the blending module (125) to determine the contribution of that pixel (e.g., its relative opacity or transparency) to the blended output image frame. That is, the blending module (125) combines the overlay image frame with the underlying image frame according to the blending factors generated for each pixel in the overlay image frame.

Figure 2:
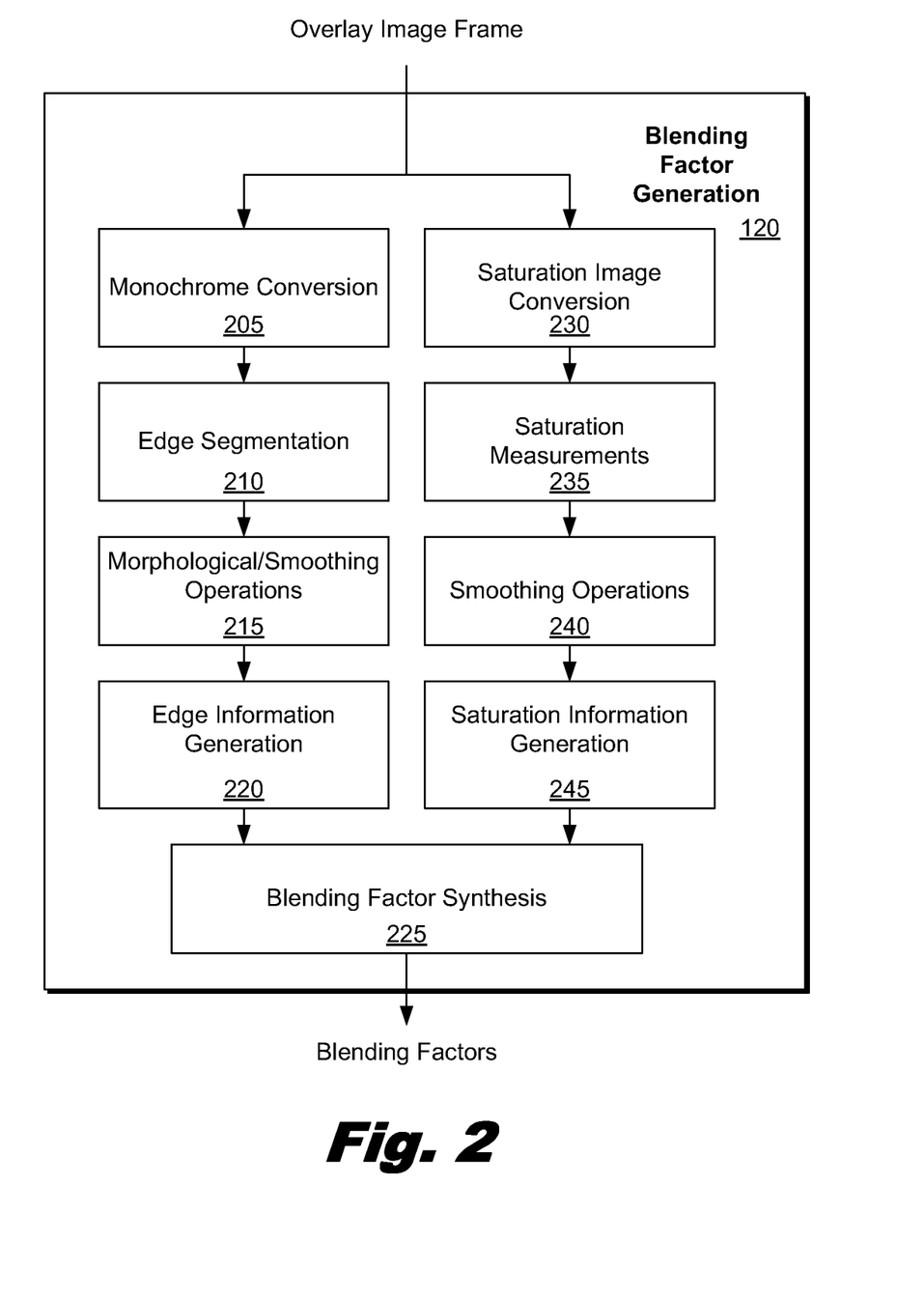
FIG. 2 is a block diagram of an illustrative blending factor generation module, according to one example of the principles described herein.

FIG. 2 is a block diagram of one example of a blending factor generation module (120), consistent with the above description of FIG. 1. In the present example, the blending factor generation module (120) produces a blending factor for each pixel in the overlay image frame based on edge and color saturation information extrapolated from the overlay image frame. The blending factor generation module (120) may receive a copy of the overlay image frame from the overlay image source (110) and analyze the overlay image frame for edge and color saturation data, which may then be synthesized into the blending factor provided to the blending module (125, FIG. 1).

In the example of FIG. 2, the overlay image frame is passed through parallel image processing pipelines to extract the edge information and color saturation information used to create the blending factors. It should be understood, however, that in other examples the image processing for both edge and color saturation information may not be performed in parallel. In still other examples, only one of the edge information or the color saturation information may be extracted from the overlay image frame to produce the blending factors. Furthermore, other types of information may be extracted from the overlay image frame and be used together with the edge and/or color saturation information to determine the blending factors. Examples of this type of additional information include, but are not limited to pixel hue information, pixel brightness information, image feature size information, image feature hue information, image feature brightness information, and the like.

As shown in FIG. 2, the edge information pipeline may include a monochrome conversion module (205) for converting the overlay image frame to a monochrome image. This conversion may facilitate the detection of image feature edges within the overlay image frame. An edge segmentation module (210) may build a binary edge map that indicates, for each pixel in the monochrome image, whether that pixel is near an image feature edge. The binary edge map may be generated using a simple edge segmentation function that examines each pixel in the monochrome image and compares that pixel to one or more selected neighboring pixels. If the current pixel and all of the selected neighboring pixel(s) have a difference smaller than a predetermined threshold, the edge value on the binary edge map for the pixel being evaluated may be set to 0, indicating that the evaluated pixel is not located on an edge. In all other cases, the edge value on the binary edge map for the pixel being evaluated may be set to 1, indicating that the evaluated pixel is located on an edge.

A morphological and smoothing operations module (215) in the edge information pipeline may perform morphological and smoothing operations on the edge map generated by the edge segmentation module (210). For example, a dilation or closing operation may be applied to the binary edge map to thicken lines and remove possible holes inside edge regions. Also, a low-pass filter may be applied to the binary edge map to create smooth transition regions between flat and edge regions indicated on the binary edge map. The low-pass filter may be an averaging, a Gaussian, or any other type of filter that may suit a particular application of the principles described herein. The size of the filter, chosen empirically, may control the width of the transition regions. For example, a larger filter size may create smoother transitions, but may also be computationally more expensive.

An edge information generation module (220) may produce edge information from the processed binary edge map for use in synthesizing a blending factor for each pixel of the overlay image frame. In certain examples, the edge-adaptive factor may be generated using a lookup table. Alternatively, the edge-adaptive factor may be separately computed for each pixel. The edge-adaptive factors for the pixels may then be provided to the blending factor synthesis module (225).

On the side of the color saturation information pipeline, a saturation image conversion module (230) may convert the overlay image frame into a color saturation image frame, such as the color saturation component used in a Hue-Saturation-Value (HSV) color space image. A saturation measurement module (235) may then determine the color saturation value of each pixel in the color saturation image frame. For example, the saturation measurement module (235) may store the color saturation value of each pixel in a map or other data structure. A smoothing operations module (240) may apply a low-pass filter to the color saturation values of produced by the color saturation measurement module (235), similar to the low-pass filter described with respect to the morphological/smoothing operations module (215) of the edge information pipeline.

A color saturation information generation module (245) may produce a color saturation-adaptive factor from the processed color saturation values for use in synthesizing a blending factor for each pixel of the overlay image frame. In certain examples, the color saturation-adaptive factor may be generated for each pixel using a lookup table. Alternatively, the color saturation-adaptive factor may be separately computed for each pixel. The color saturation-adaptive factors for the pixels may then be provided to the blending factor synthesis module (225).

The blending factor synthesis module (225) may synthesize a blending factor for each pixel of the overlay image frame from the received edge-adaptive factor and color saturation-adaptive factor corresponding to that particular pixel. In certain examples, the greater of the edge-adaptive factor and the color saturation-adaptive factor may be set as the blending factor. Alternatively, a weighted combination of the edge-adaptive factor and the color saturation-adaptive factor may be set as the blending factor.

Figure 3:
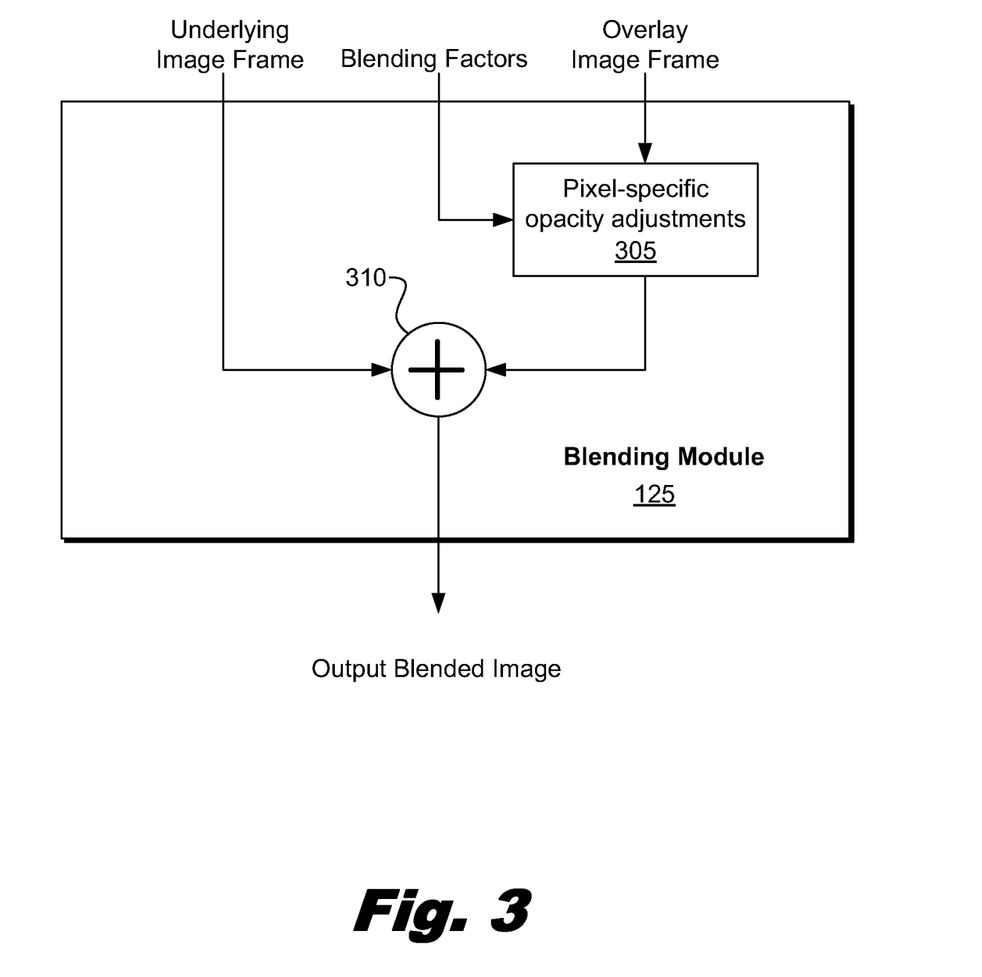
FIG. 3 is a block diagram of an illustrative image blending device, according to one example of the principles described herein.

FIG. 3 is a block diagram of one example of a blending module (125) consistent with the principles described in relation to FIG. 1. The blending module (125) receives as input the original overlay image frame, the original underlying image frame, and the blending factors produced by the blending factor generation module (120) for each pixel of the overlay image frame. Based on the blending factor for each pixel of the overlay image frame, a pixel-specific opacity adjustment module (305) may adjust the pixel to increase or decrease the opacity of that pixel in the output blended image frame.

In certain examples, the opacity of a pixel may be increased by increasing the saturation of that pixel, and the transparency of the pixel may increased by decreasing the saturation of that pixel. Additionally or alternatively, opacity may be added to a region of one or more pixels by adding random noise or a pattern with a small magnitude which is lower than the threshold used in the edge segmentation to the pixels in the region. An adder circuit (310) may sum the underlying image frame with the adjusted overlay image frame to produce the output blended image frame.

Figure 4:
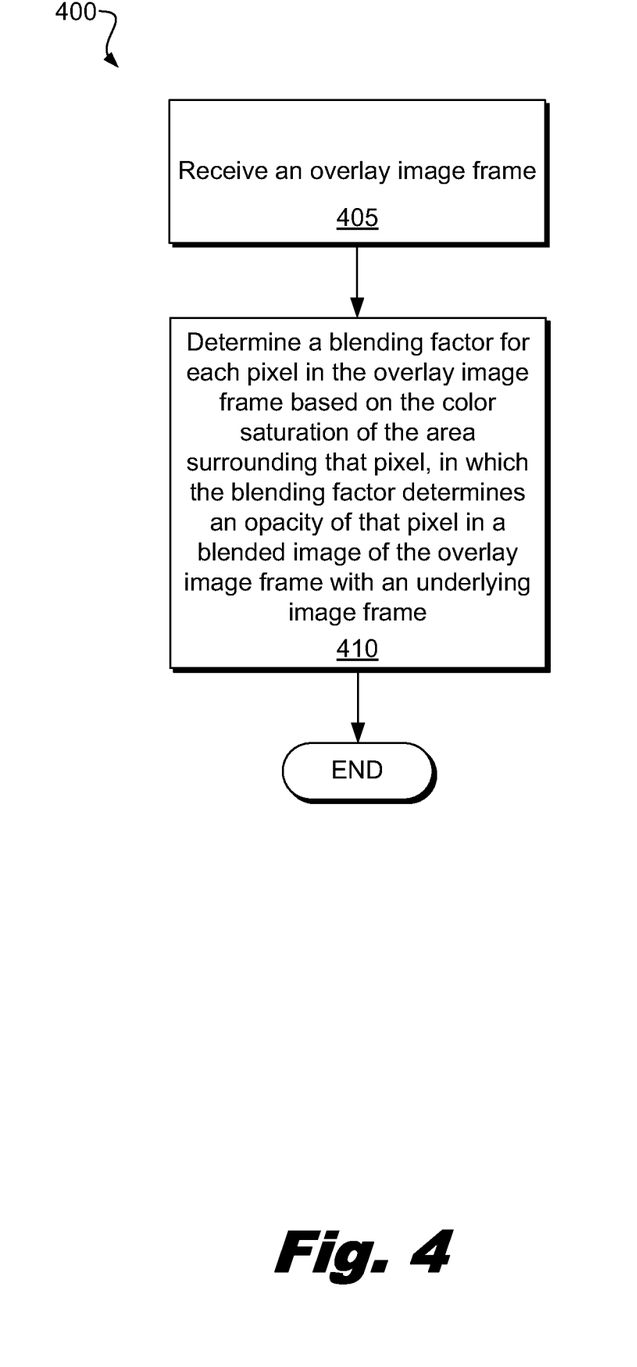
FIG. 4 is a block diagram of an illustrative method for creating a blended image, according to one example of the principles described herein.

FIG. 4 is a flowchart diagram of an illustrative method (400) for creating a blended image, according to one example of the principles of the present specification. The method (400) may be performed, for example, by one ore more image processing devices implemented by electronic circuitry, such as such as an application-specific integrated circuit and/or a machine executing machine-readable code stored on a tangible medium.

According to the method (400), an overlay image frame is received (block 405). A blending factor is then determined (block 410) for each pixel in the overlay image frame based on the color saturation of the area surrounding that pixel. For example, the color saturation of a number of neighboring pixels may be analyzed to determine the blending factor for a given pixel in the overlay image frame. In certain examples, additional information from the overlay image frame may be used with the aforementioned color saturation information to determine the blending factor for each pixel of the overlay image frame. The blending factor determined for each pixel indicates an opacity of that pixel in a blended image of the overlay image frame with an underlying image frame.

Figure 5:
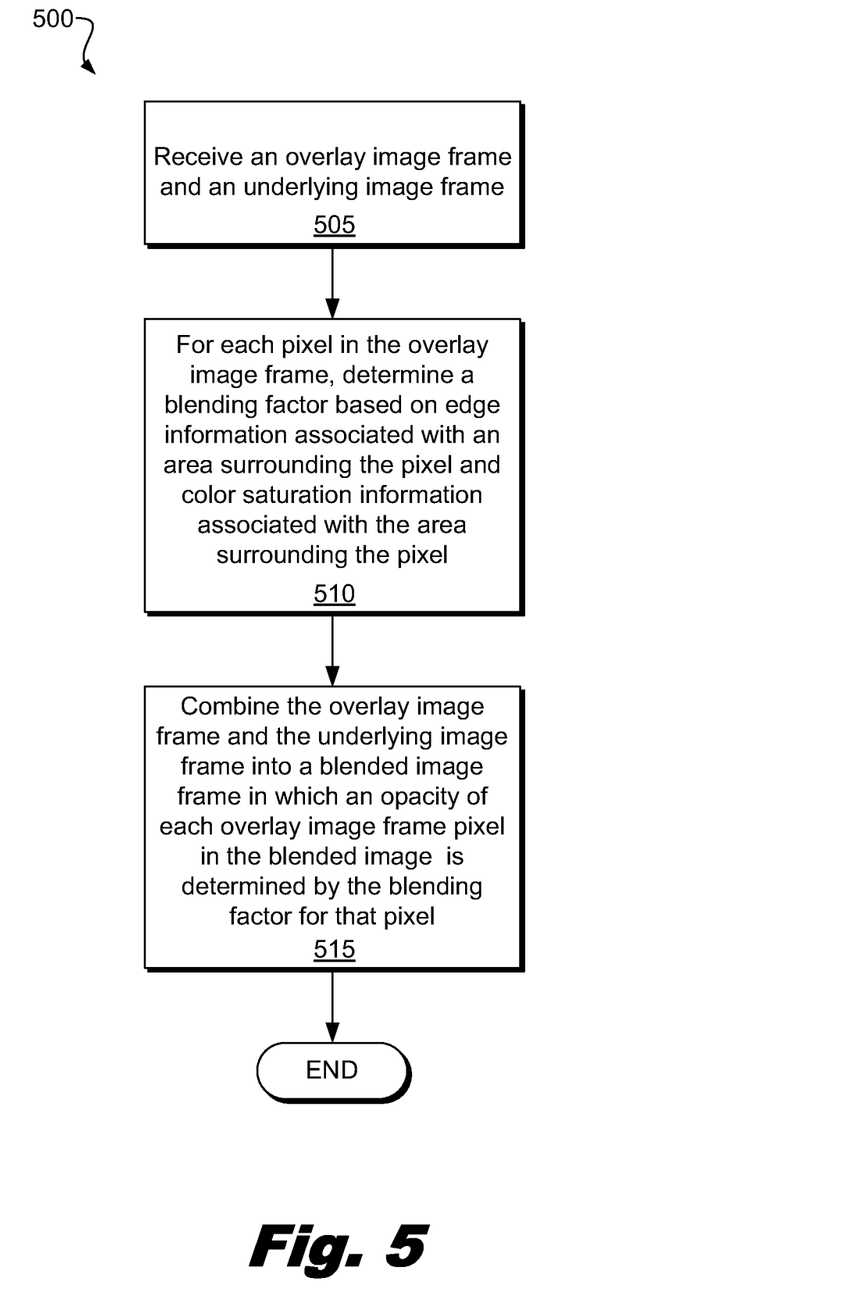
FIG. 5 is a block diagram of an illustrative method for creating a blended image, according to one example of the principles described herein.

FIG. 5 is a flowchart diagram of another illustrative method (500) for creating a blended image, according to one example of the principles described herein. The method (500) may be performed by one or more image processing devices implemented by electronic circuitry, such as an application-specific integrated circuit and/or a machine executing machine-readable code stored on a tangible medium.

According to the method (500) of FIG. 5, an overlay image frame and an underlying image frame are received (block 505). Then, for each pixel in the overlay image frame, a blending factor is determined (block 510) based on edge information associated with an area surrounding the pixel and color saturation information associated with the area surrounding the pixel. The overlay image frame and the underlying image frame are then combined (block 515) into a blended image frame in which an opacity of each overlay image frame pixel in the blended image is determined by the blending factor for that pixel.

Figure 6:
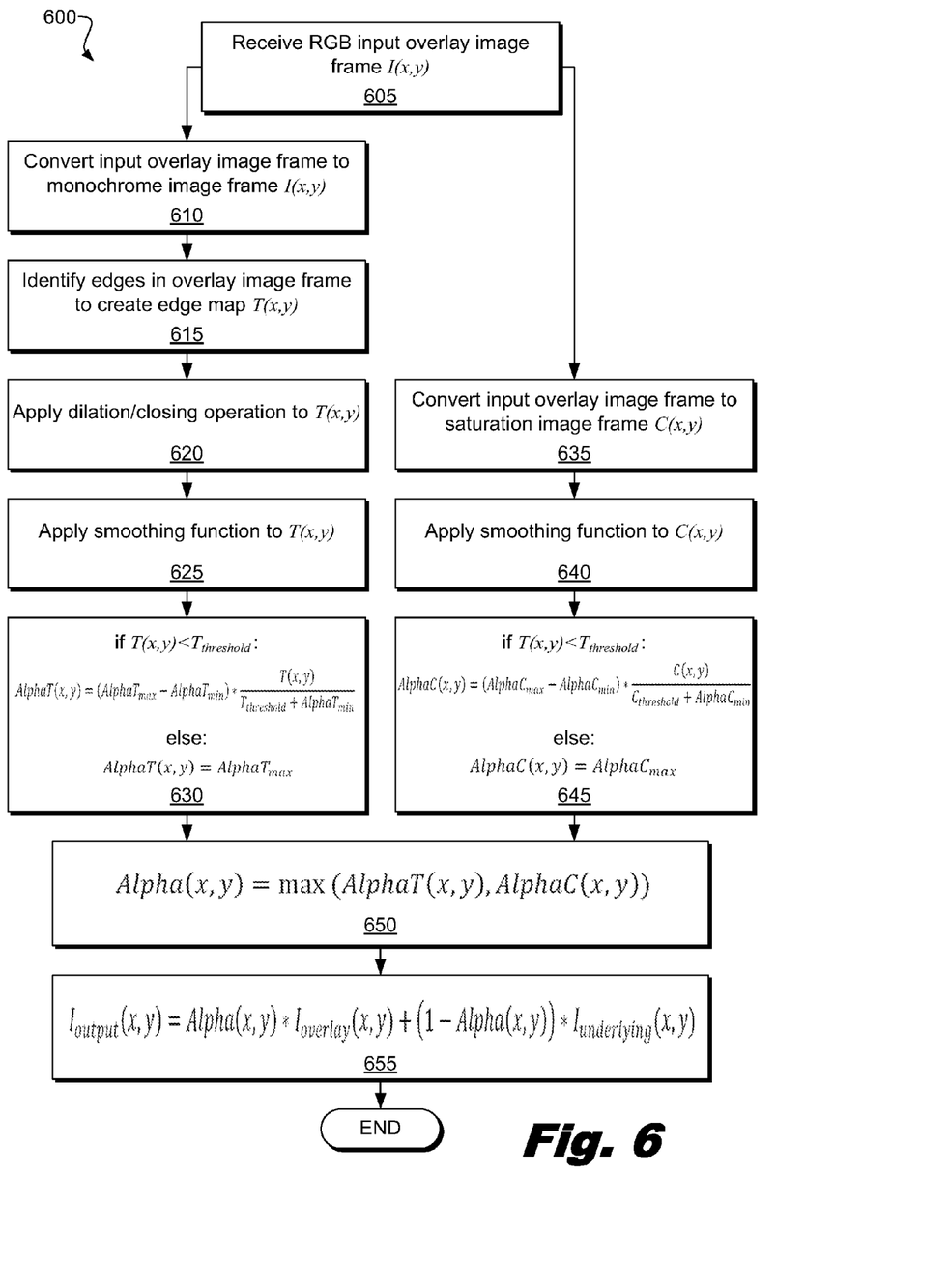
FIG. 6 is a block diagram of an illustrative method for creating a blended image, according to one example of the principles described herein.

FIG. 6 is a flowchart diagram of a detailed example of a method (600) for creating a blended image consistent with the principles described in relation to the previous figures. Similar to FIGS. 4-5, the method (600) may be performed by one or more image processing devices implemented by electronic circuitry, such as an application-specific integrated circuit and/or a machine executing machine-readable code stored on a tangible medium.

According to the method (600) of FIG. 6, an input overlay image frame is received (block 605) in a Red-Green-Blue (RGB) color space format. The overlay image frame is then processed by two parallel pipelines—an edge information pipeline that includes blocks 610, 615, 620, 625, and 630, and a color saturation information pipeline that includes blocks 635, 640, and 645.

In the edge information pipeline, the overlay image frame is first converted (block 610) into a monochrome image frame I(x, y), in which (x, y) identifies a pixel at column x, row y.

Edges in the overlay image frame are then identified (block 615) to create a binary edge map T(x, y). A simple edge detection function may be applied to the I/(x, y) to produce the edge map T(x, y). For example, for each pixel (x, y) in the monochrome image I(x, y), the binary edge value T(x, y) may be determined by comparing the value of that pixel (x, y) with its four surrounding pixels such that:

if $|I(x, y)-I(x-1, y)|<Et$ and $|I(x, y)-I(x, y-1)|<Et$ and
$|I(x, y)-I(x+1, y)|<Et$ and $|I(x, y)-I(x, y+1)|<Et$ then $T(x, y)=0$ else $T(x, y)=1$ where Et is a predetermined threshold.

This function may be adapted to fit the availability of computational resources in a particular application of the principles of this specification. For example, if computational resources are scarce, the edge detection function may only consider two of the neighboring pixels instead of four. Conversely, if computational resources are abundant, the edge detection function may consider additional neighboring pixels, such as diagonally neighboring pixels and/or pixels that are located further away from the pixel being evaluated.

Once the edge map T(x, y) has been populated with an edge value for each pixel of the overlay image frame, a dilation and/or closing operation may be applied (block 620) to T(x, y) to thicken edge lines and/or remove possible holes within edge regions. Furthermore, a smoothing function may be performed (block 625) on T(x, y) by applying a low-pass filter to T(x, y) that creates smooth transition regions between flat and edge regions of T(x, y). The low-pass filter may be an averaging, a Gaussian, or other type of low-pass filter. The size of the filter, chosen empirically, may control the width of the transition regions.

At this stage of the edge information pipeline, an edge-adaptive factor AlphaT(x, y) may be generated (block 630) for each pixel of the overlay image frame using the filtered version of T(x, y). The edge-adaptive factor AlphaT(x, y) may be determined using the formula shown in block 630. In certain embodiments, the edge-adaptive factor AlphaT(x, y) for each pixel may be generated using a lookup table. Alternatively, the edge-adaptive factor may be individually computed for each pixel.

In the color saturation information pipeline, the input overlay image frame is converted into a color saturation image frame C(x, y), for example by converting (block 635) the RGB version of the overlay image frame to the S component of an HSV color space version of the overlay image frame. A smoothing function may be performed (block 640) on C(x, y) using a low-pass filter, as described with respect to block 625 of the edge information pipeline. The filtered version of C(x, y) may be used to generate (block 645) a color saturation-adaptive factor AlphaC(x, y) for each pixel of the overlay image frame, using the formula shown in block 645.

A blending factor Alpha(x, y) may be generated (block 650) for each pixel of the overlay image frame by simply taking the maximum of the edge-adaptive factor AlphaT(x, y) and the color saturation-adaptive factor AlphaC(x, y). The final blended output image $I_{output}(x, y)$ may then be produced (block 655) by combining the overlay image with an underlying image. For each blended pixel in $I_{output}(x, y)$, the contribution to that pixel from the overlay image frame is determined by Alpha(x, y), and the contribution to that pixel from the underlying image frame is determined by (1–Alpha(x, y)).

The methods and systems for creating blended images described in the present specification provide several beneficial features. For example, the readability of the overlay image frame is well-preserved in the blended image. The brightness, contrast, and color saturation of the overlaid contents are almost unchanged in comparison to displaying the overlay image frame on its own. A halo may be created around the edges of image features of the overlay image frame to enhance the edges and disambiguate them from the underlying image frame.

Additionally, the underlying image frame is well-exposed. The unused regions of the overlay image frame may be fully transparent, such that the brightness, contrast, and color saturation of the contents of the underlying image frame are almost unchanged in comparison to displaying the underlying image frame on its own.

The methods and systems of the present specification may be used for any type of image content in the overlay image frame. Significantly, the methods and systems of the present specification do not require any additional information (e.g., masks of transparent and opaque regions) from overlay image source and the underlying image source. Thus, no modifications to source applications are needed to implement these methods and systems, and no bandwidth is needed to transfer opacity masks to the blending device. Moreover, the source applications may dynamically alter the opacity of regions of the overlay image source and underlying image source without constantly regenerating new opacity masks for the blending device.

Furthermore, the systems and methods of the present specification effectively produce blended images with low computational complexity, as simple filters and operations are used to determine the blending factors, and processing of the underlying image frame is not necessary. As such, two images may be blended in real-time with low computational overhead.

Figure 7:
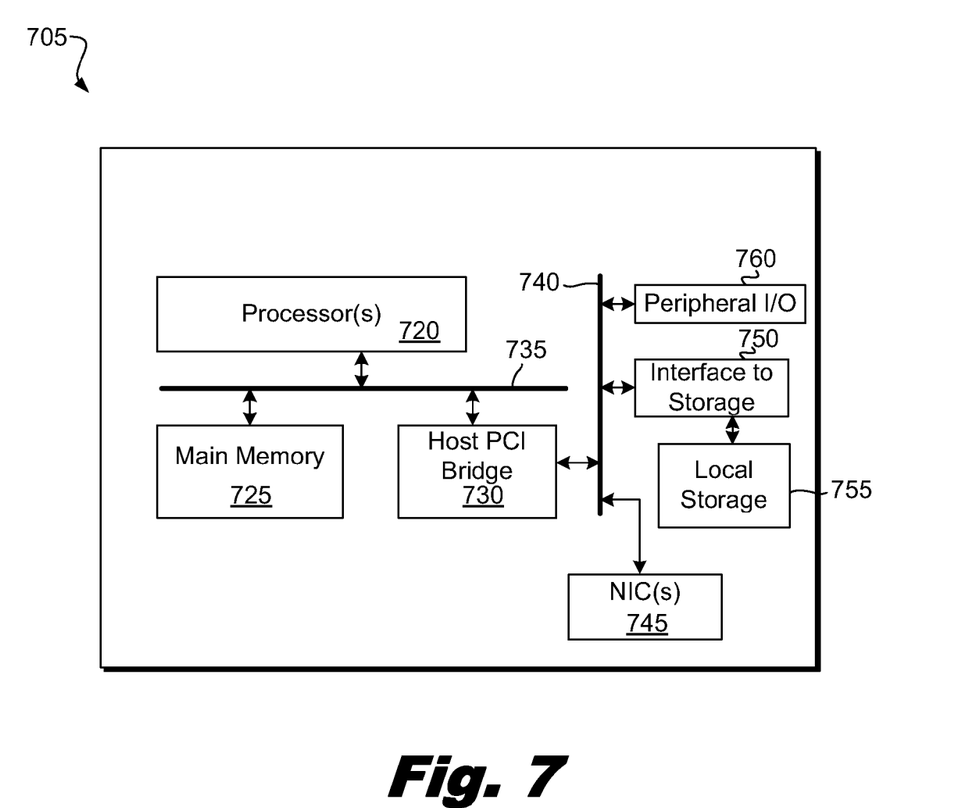
FIG. 7 is a block diagram of an illustrative computing device for implementing an illustrative image blending system, according to one example of the principles described herein.

FIG. 7 is a block diagram of an illustrative computing device (705) that may be used to implement any of the devices, systems, modules, or functionality described in connection with the present specification and the appended claims. In certain examples, the same computing device (705) may implement multiple modules, systems, and/or methods. Additionally or alternatively, certain modules, systems, and/or methods may be implemented as one or more application-specific integrated circuits, or as a combination of application-specific integrated circuits and general-purpose computing devices.

In this illustrative device (705), an underlying hardware platform of electronic circuitry executes machine-readable instructions to exhibit a desired functionality. For example, if the illustrative device (705) implements the blending factor generation module (120) and the blending module (125) of FIG. 1, the machine-readable instructions may include at least instructions for blending an image frame received from a first image source with an image frame received from a second image source by: a) for each pixel in the image frame received from the first image source, determining a blending factor based on the edge information for an area surrounding the pixel and/or the color saturation information for the area surrounding the pixel; b) creating a version of the image frame received from the first image source by altering each pixel in the image frame received from the first image source based on the blending factor determined for that pixel; and c)

combining the altered version of the image frame received from the first image source with the image frame received from the second image source.

The hardware platform of the illustrative device (705) may include at least one processor (720) that executes code stored in the main memory (725). In certain examples, the processor (720) may include at least one multi-core processor having multiple independent central processing units (CPUs), with each CPU having its own L1 cache and all CPUs sharing a common bus interface and L2 cache. Additionally or alternatively, the processor (720) may include at least one single-core processor.

The at least one processor (720) may be communicatively coupled to the main memory (725) of the hardware platform and a host peripheral component interface bridge (PCI) (730) through a main bus (735). The main memory (725) may include dynamic non-volatile memory, such as random access memory (RAM). The main memory (725) may store executable code and data that are obtainable by the processor (720) through the main bus (735).

The host PCI bridge (730) may act as an interface between the main bus (735) and a peripheral bus (740) used to communicate with peripheral devices. Among these peripheral devices may be one or more network interface controllers (745) that communicate with one or more networks, an interface (750) for communicating with local storage devices (755), and other peripheral input/output device interfaces (760).

The configuration of the hardware platform of the device (705) in the present example is merely illustrative of one type of hardware platform that may be used in connection with the principles described in the present specification. Various modifications, additions, and deletions to the hardware platform may be made while still implementing the principles described in the present specification The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for creating a blended image, comprising:
    receiving an overlay image frame and an underlying image frame in a device (105) implemented by electronic circuitry, each of said image frames comprising a plurality of pixels;
    for each said pixel in the overlay image frame, determining with the device (105) a blending factor based on edge information associated with an area surrounding the said pixel and color saturation information associated with the area surrounding the said pixel; and
    combining the overlay image frame and the underlying image frame into a blended image frame with the device (105), an opacity of each said pixel of the overlay image frame in the blended image being determined by the blending factor for that said pixel.

2. The method of claim 1, in which the opacity of a said pixel of the overlay image frame in the blended image increases in response to at least one of: the said pixel being located near at least one image feature edge in said overlay image frame; and the color saturation surrounding that said pixel being greater than a predefined threshold.

3. The method of claim 1, further comprising:
    creating an edge map for the overlay image frame, said edge map comprising an indication, for each said pixel of the overlay image frame, of whether that said pixel is part of at least one image feature edge;
    applying a low-pass filter to the edge map; and
    for each said pixel of the overlay image frame, using a result from the low-pass filter as the edge information associated with the area surrounding the said pixel.

4. The method of claim 3, in which the edge map is created from a monochromatic version of the overlay image frame.

5. The method of claim 1, further comprising:
    creating a color saturation map for the overlay image frame, said color saturation map comprising a measured color saturation value for each said pixel of the overlay image frame;
    applying a low-pass filter to the color saturation map; and
    for each said pixel of the overlay image frame, using a result from the low-pass filter to determine the color saturation information associated with the area surrounding the said pixel.

6. The method of claim 1, further comprising, for each said pixel in said overlay image frame:
    determining an edge factor for the said pixel based on said edge information for the said pixel;
    determining a color saturation factor for the said pixel based on the color saturation information for the said pixel; and
    determining the blending factor for the said pixel based on the edge factor for the said pixel and the color saturation factor for the said pixel.

7. The method of claim 6, further comprising determining the blending factor to be the higher of the edge factor and the color saturation factor.

8. An image processing system, comprising:
    electronic circuitry (105, 705) communicatively coupled to a first image source (110) and a second image source (115), in which the electronic circuitry (105, 705) blends an image frame received from the first image source (110) with an image frame received from the second image source (115) by:
        for each of a plurality of pixels in the image frame received from the first image source (110), determining a blending factor based on edge information for an area surrounding the said pixel and color saturation information for the area surrounding the said pixel;
        creating a version of the image frame received from the first image source (110) by altering each said pixel in the image frame received from the first image source (110) based on the blending factor determined for that said pixel; and
        combining the altered version of the image frame received from the first image source (110) with the image frame received from the second image source (115).

9. The system of claim 8, in which the electronic circuitry (105, 705) determines the edge information for each said pixel in the image frame received from the first image source by:
    converting the image frame received from the first image source to a monochrome image frame comprising a plurality of pixels; and
    for each said pixel in the monochrome image frame, storing an indication of whether the said pixel is part of an image feature edge by comparing the said pixel to at least one neighboring pixel; and
    applying a low-pass filter to the stored indications for the pixels in the monochrome image frame.

10. The system of claim 8, in which the electronic circuitry (105, 705) determines the color saturation information for each said pixel in the image frame received from the first image source (110) by:
  for each said pixel in the image frame received from the first image source (110), storing an indication of a color saturation measured for that said pixel; and
  applying a low-pass filter to the stored indications of color saturation for the pixels of the image frame received from the first image source (110).

11. The system of claim 10, the electronic circuitry (105, 705) further comprising a lookup table for determining at least one of the edge information and the color saturation information.

12. The system of claim 10, in which the electronic circuitry (105, 705) determines the blending factor for each said pixel in the image frame received from the first image source (110) by:
  generating an edge factor for the said pixel based on the edge information for the said pixel;
  generating a color saturation factor for the said pixel based on the color saturation information for the said pixel; and
  setting the greater of the edge factor for the said pixel and the color saturation factor for the said pixel as the blending factor for the said pixel.

* * * * *